United States Patent [19]
Symmons et al.

[11] 3,799,294
[45] Mar. 26, 1974

[54] BRAKE FOR ROTATABLE SHAFT

[75] Inventors: Edgar B. Symmons; George L. Coad, both of Walnut Creek, Calif.

[73] Assignee: Applied Radiation Corporation, Walnut Creek, Calif.

[22] Filed: June 23, 1972

[21] Appl. No.: 265,703

[52] U.S. Cl. .................................... 188/67, 74/531
[51] Int. Cl. ............................................ B65h 59/10
[58] Field of Search .................. 188/67, 83; 74/531

[56] References Cited
UNITED STATES PATENTS

| | | | |
|---|---|---|---|
| 2,161,661 | 6/1939 | Arens | 74/531 |
| 3,199,635 | 8/1965 | Bessler et al. | 188/196 P |
| 3,602,340 | 7/1971 | Budzich et al. | 188/67 |

FOREIGN PATENTS OR APPLICATIONS

| | | | |
|---|---|---|---|
| 754,881 | 3/1967 | Canada | 188/67 |

Primary Examiner—George E. A. Halvosa

[57] ABSTRACT

A brake for a rotatable shaft in which the shaft is joined or is integral to one of a concentric pair of members consisting of an inner and outer members having an annular gap therebetween in which an O-ring is disposed of such a size as to make an interference fit with both members and therefore is radially compressed and deformed in the gap to provide a high static braking torque. One of the members is axially moveable between limiting axial positions, such movement causing a rolling of the O-ring along the gap. A recess is formed in the outer member for interrupting the annular gap and providing free accomodation of the O-ring in one position of axial relationship of the members to permit relative rotation therebetween.

4 Claims, 6 Drawing Figures

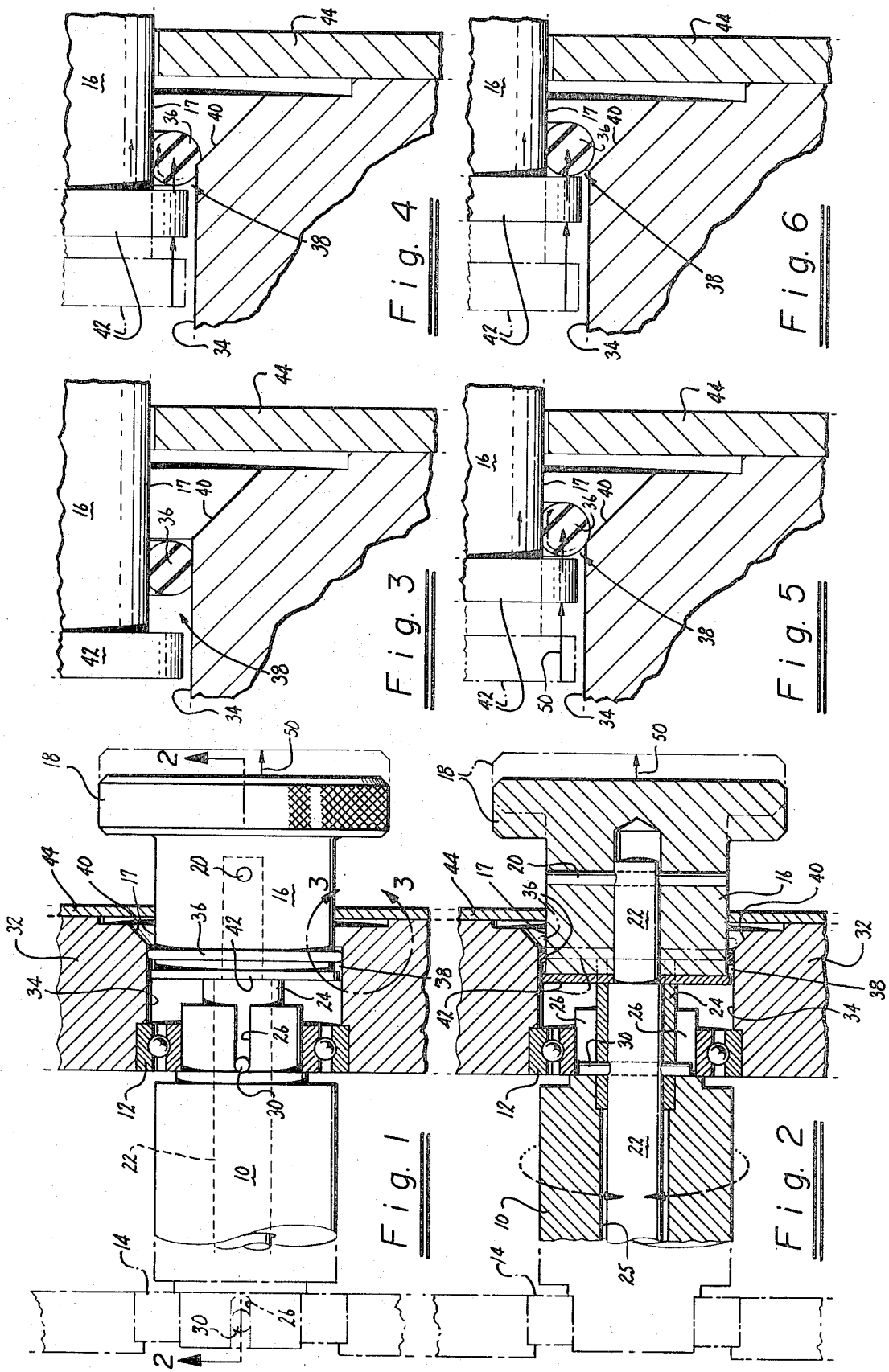

BRAKE FOR ROTATABLE SHAFT

BACKGROUND OF THE INVENTION

This invention relates to a brake for a rotatable shaft and more particularly to such a brake which is readily hand actuated by axial movement of a handle or knob.

Heretofore, various devices have been employed for locking shafts in a particular position and for permitting or facilitating rotation of the same as may be desired. Such devices have commonly required high-actuating forces for a given amount of holding torque, are unduly complex in construction, and thus proportionately expensive to construct. There is therefore a need for a new and improved brake for a rotatable shaft.

SUMMARY OF THE INVENTION AND OBJECTS

In general, it is an object of the present invention to provide a brake for a rotatable shaft which will overcome the above limitations and disadvantages.

It is a further object of the present invention to provide a shaft brake of the above character that is actuated by axial movement of one of the elements as by a handle or knob thereon, and in which the axial force required to actuate the brake is low compared to the large rotational braking force obtained.

It is a further object of the invention to provide a shaft brake of the above character in which the actuating motion causes a relative rolling of the parts between two spaced stable positions so that the brake is stable either in its actuated or disengaged state and has no tenency to creep between states.

Another object of the invention is to provide a shaft brake of the above character which is actuatable by axial motion thereby providing precise index of the shaft at a predetermined location without any slight variation as the brake is actuated.

Further object of the invention is to provide a shaft brake which is particularly adapted to instances where hand rotation of a shaft to effect movement of other mechanical elements is utilized and in which hand actuation of the brake in a precise location or index of the shaft is desired. An example is a device for the translational movement of a medical treatment couch mounted on a rotatable shaft and which is used for moving patients relative to large fixed treatment devices, such as is used in radiation treatment.

In general the present invention cooperates with a rotatable shaft which may be set in bearings which permit rotation but restrain axial movement. Means are provided for forming an inner and outer concentric pair of members, one of said pair of members serving as a shaft or being connected to same, while the other of the members serves as a brake. One of the members is fixed and therefore serves as a brake while the other member is rotatable as by being attached to or part of a shaft or other rotating device or machinery. The inner member is provided with a radially outwardly facing cylindrical surface and the outer member is provided with a radially inwardly facing cylindrical surface spaced radially from the outer surface of the inner member to define an annular gap. An O-ring is disposed in the gap between the inner and outer members and is such a size as to be compressed and deformed into engagement with both the surfaces thereof so as to restrain rotational movement by frictional forces between the O-ring and the members, while permitting axial movement of the members relative to each other by rolling motion of the O-ring. Means is provided for forming a recess interrupting the outer member at a position corresponding to a position assumed by the O-ring as the axially moveable member reaches a defined limit of travel, and a size to freely accomodate the O-ring in that position and thereby permit rotational movement of the rotating member.

These and other objects and features of the invention will become apparent from the following description and claims when taken into conjunction with the accompanying drawings.

BRIEF DESCRIPTION OF THE FIGURES

FIG. 1 is a view partly in elevation and partly in cross section of a brake for a rotatable shaft constructed in accordance with the present invention.

FIG. 2 is a cross-sectional view taken along the lines 2—2 of FIG. 1.

FIG. 3 is a view partly in cross section taken along the lines 3—3 of FIG. 1 and showing the brake in actuated position.

FIGS. 4 and 5 are views similar to FIG. 3 showing the brake progressing toward an unactuated position.

FIG. 6 is a view similar to FIG. 3 showing the brake disengaged.

DETAILED DESCRIPTION OF THE PREFERRED EMBODIMENT

Referring now to the Figures, there is shown a particular embodiment of the present invention which relates to the controlling of the path position of a heavy couch or table (not shown) such as is used in medical radiation therapy. The table may be supported and move on rotatable shafts one 10 of which is shown in the drawings and is mounted in radial roller bearings 12, 14 at each end thereof. The angular position of the shaft serves to determine the exact position of patient location relative to the fixed geometrical pattern produced by a source of radiation, as for example a linear accelerator which delivers treating radiation through a specific location or isocenter at which the portion of the patient to be treated is desired to be located.

Means is provided for forming an inner and outer concentric pair of members, the inner one of said members consisting of a cylindrical body 16 having a radially outward facing surface 17 associated therewith and is connected by means to be described to the shaft 10. In the present application the cylindrical body 16 comprises the body portion of a handle or knob 18 which is secured by a pin 20 to one end of a push rod 22 mounted for axial translation in bushings 24 (one shown) mounted within a bore 26 of shaft 10. The push rod is free to move axially in the bushings between limit stops defined by slots 26 in the shaft walls into which positioning limiting pins 30 extend. The pins 30 are placed further apart than the inner extremities of the slots to thereby define a predetermined limiting distance of motion which the push rod may assume as it travels axially back and forth within the shaft. Thus, while the shaft is free to rotate in a fixed axial position in bearings 12, the knobs carried at each end of the push rod within the shaft are engaged for rotation by the pins 30 engaging slots 26 and are further free to be axially moved with respect to the shaft and outer member a distance defined by the difference in spacing between the pins and the inner ends of the slots.

The outer member 32 of the embodiment shown consists of a portion of the supporting framework of the device in which is formed a bore 34 or cylindrical chamber which receives the inner member or handle body 16. The bore defines a radially inwardly facing surface which together with the outwardly facing surface of the body of handle 14 defines an annular gap 38 of uniform dimension and generally in the shape of a cylindrical shell.

An O-ring 36 is disposed between the inner and outer members and in the annular gap therebetween. The O-ring is selected to have an interior diameter which is at least somewhat radially expanded when positioned on the inner member (see FIG. 6). It is constructed with an outer diameter when so positioned on the inner member as to be radially inwardly compressed by the outer member when the O-ring is positioned in the annular gap. Thus, when located in the gap the O-ring presents a large frictional resistance to rotation of the rotatable inner member because of the frictional engagement caused by compression, deformation, and consequent enlargement of contact between the O-ring and surfaces 17, 34 of the members.

Means are provided for forming a recess 40 interrupting the cylindrical surface of the outer member at a predetermined position thereof and is for example formed in the embodiment shown by an outwardly opening bevel found in member 32. The recess is large enough to accomodate the O-ring in a relaxed or uncompressed state as it enters to thereby permit the rotatably mounted inner member to freely rotate.

The present invention is now more broadly characterized in terms of inner and outer members and the specific arrangement by which the outer member constitutes a non-rotatable brake drum defining a cylindrical bore into which a cylindrical body of the rotating element is disposed should be understood to be reversable without departing from the teachings of the present invention.

The O-ring is more generally characterized as a deformable resilient gasket of toroidal form and thus can be a conventional O-ring made of elastomeric material. Such elastomeric material preferably is of a non-slippery character, and thus is preferrably made of a rubber-like thermoplastic polymer compounded to yield a high coefficient of friction with respect to the material of which the inner and outer members is made. The O-ring type structure is dimensioned to be substantially deformed both by radial expansion on inner member 16 and by compression from member 32 as shown in FIG. 3 so that significant increase of the area of contact between the members is obtained with a corresponding increase in the static tortional braking force. The O-ring structure posseses a hysteresis or a memory with respect to being turned inside out and is relaxed in the rotational orientation in which formed. Thus, by spacing the limits of travel of the inner member with respect to the outer member the number of rotations of the O-ring is defined by making the limits correspond to one (or other integer) the O-ring is in a stable or rotationally relaxed state at each of the limits of travel and any tendency of the parts to creep after the brake has been set is avoided due to the immediate increase in rotational resistance encountered as the inner and outer members are moved in respect to each other and the O-ring begins to roll away from its rotationally relaxed state. An example of such elastomeric material having a high coefficient of friction is the thermoplastic rubber sold under the trademark Kraton by Shell Oil Company.

In order to insure the retention of the O-ring on the inner member in an appropriate position a limiting rim 42 or flange extends radially outwardly from the inward end of the inner member and provides a limit beyond which the O-ring cannot roll so that the same cannot slip off the end of the inner member during relative axial movement thereof. In addition, faceplate flange 44 is provided on the framework with an aperture to provide small clearance between itself and the body of the inner member and thus keep dirt and other contaminants out of the device.

The operation of the shaft brake of FIGS. 1 and 2 will now be described with reference to the sequence of movement of the elements of the brake as depicted in FIGS. 3 through 6. FIG. 3 shows the brake in actuated position with the O-ring compressed within the gap between the inner and outer members. In this position the deformation of the O-ring both radially inwardly by the outer member and radially outwardly by the inner member is evident and causes enlargement of the surface of contact between each of the members of deformation and consequent increase in the static tortional resistance to rotation.

As the inner member is moved relative to the outer member as by pulling the knob axially in the direction of arrow 50 the inner member causes the O-ring to begin to rotate inside out due to rolling friction on each of the respective surfaces 17 and 34. The position of the O-ring as it enters the recess formed by the bevel is shown in FIGS. 4 and 5. FIG. 6 shows the O-ring fully and freely accomodated within the recess at which location the knob is then free to rotate and in turn therefore to rotate the shaft to which it is connected.

The limit of travel between actuated and disengaged positions as defined by the spacing of the pins 30 or by the spacing of the inward rim 44 of each of the knobs is such that the O-ring makes a complete cycle of inside out rotation between such limits to provide both an anti-creep property at each limit and a detent feel as it is rotated through non-relaxed state.

Thus, there has been provided an effective shaft brake which has good operator feel, low actuating force, high static torque when actuated, and exceptionally simple in construction. The brake of the present invention also provides precise indexing as the same is actuated; for, as shown in FIG. 5, there is a continuous, uniform, and symetrical contact between the inner brake and outer elements as the same are engaged.

To those skilled in the art to which the present invention pertains, many modifications and variations thereof will occur, thus it is apparent that in the present form of the invention the axial movement of the inner member is, with respect to the outer member obtained by mounting the same on bushings carried on the rotatable shaft. However, many applications will be seem in which the rotatable shaft may itself be mounted for both rotational and axial movement and thereby be carried or carry the actuating knob or brake constituting the inner element between actuated and disengaged positions. Similarly the outer element may itself constitute a shaft having an inward bore therein into which extends a fixed inner element. Thus, it will be seen that the rotational or fixed character of each of the elements of the present brake may be interchanged without departing from the teachings of the present invention. Accordingly, the specific description and disclosures herein should be understood to have been presented in a descriptive sense, by way of an example of a useful application of the invention, the scope of which, however, should be interpreted by reference to the appended claims.

We claim:

1. A shaft brake comprising means forming a concentric pair of inner and outer cylindrical members, one of said members serving as a shaft and the other serving as a brake, means for mounting one of said members for axial movement relative to the other, means defining a spaced axial limit of travel of said one member, means for mounting one of said members for rotational movement relative to the other member, said inner member defining a radially outwardly facing cylindrical surface, said outer member having a radially inwardly facing cylindrical surface, said surfaces being radially spaced from each other, an O-ring of an elastomeric material adapted to radially contract and expand between a compressed state and an uncompressed state, respectively, said O-ring being axially movable continuously and selectively to a position in said compressed state between said inner and outer members and of such size as to be in frictional engagement with both of said surfaces thereof, the O-ring in said compressed state serving to restrain rotational movement by frictional forces while permitting axial movement, recess means forming a discontinuous interruption of the cylindrical surface of said outer member at one of the limits of travel, said recess means further forming a radial spacing between said inner and outer members, said O-ring being axially movable continuously and selectively to another position in said uncompressed state where the O-ring is freely accomodated in said recess means in said one axially limiting position of said members to permit relative rotation of said members.

2. In a brake mechanism, a shaft, bearing means mounting said shaft for rotation, shaft control means connected for rotation with such shaft and having a circularly cylindrical exterior conformation in cross section, means mounting said shaft control means for axial movement relative to said bearing means, a non-rotatable drum surrounding said shaft control means having a first portion defining an annular gap of first dimension between said drum and said shaft control means and a second portion of greater dimension defining a recess about said shaft control means, a resilient gasket radially deformable between compressed and uncompressed states and of toroidal form having an interior form corresponding to the outer diameter of said shaft control means, said gasket having an external dimension being slightly larger than said annular gap, said gasket being mounted on said shaft control means for continuous and selective axial movement such that axial movement of said shaft control means causes the gasket to roll between first and second axially spaced positions, whereby in said first position said gasket is in its compressed state and is disposed within said gap whereby said shaft is locked against rotation by the friction between the drum, gasket and shaft control means, and in said second position said gasket is in its uncompressed state and is disposed within said recess whereby said shaft is free to rotate due to clearance about the gasket in said recess, said gasket having an elastic memory which creates internal forces for returning the gasket to a rotationally relaxed condition, said gasket being sized in relation to said exterior conformation of the shaft and said outer diameter of the shaft control means so that the gasket assumes said rotationally relaxed condition substantially at said first and second positions.

3. A shaft brake comprising a pair of inner and outer concentric members one of which is connected to a rotatable shaft, an O-ring disposed about said inner member, said O-ring being formed of a material adapted to radially contract and expand between compressed and uncompressed states, respectively, an axially projecting rim mounted on said inner member at a location beyond which the movement of said O-ring is to be restricted, means forming a recess in said outer member opening outwardly through which said inner member and O-ring may freely pass and having an inner portion within which said O-ring is in an interference fit and assumes said compressed state so that relative rotation between said members is braked by frictional engagement between said inner and outer members, and said O-ring being adapted to be axially moved continuously and selectively to a position whereat said O-ring is located in said recess and is in said uncompressed state to permit relative rotation of said members, said inner portion forming a sharply discontinuous juncture with said recess means whereby said O-ring is caused to pass between its compressed and uncompressed states across said juncture responsive to a relatively small axial movement thereof in relation to the width of said O-ring.

4. A shaft brake comprising a pair of inner and outer concentric members, a rotatable shaft connected to one of said members, either of said members being axially movable relative to the other of said members, an aperture formed through such shaft, a push rod disposed through said shaft and operatively connected to the member which is axially movable, means at the opposite ends of said rotatable shaft forming hand-operable knobs and mounted for axial movement on said push rod and relative to said shaft, means interconnecting said push rod between said knobs whereby said shaft brake is actuatable from either end of said rotatable shaft, an O-ring disposed about said inner member, an axially projecting rim mounted on said inner member at a location beyond which the movement of said O-ring is to be restricted, said outer member having a recess opening outwardly through which said inner member and O-ring may pass and having an inner portion in which said O-ring is compressed into an interference fit so that relative rotation between said members is braked by frictional engagement between said inner and outer members, said O-ring being adapted upon axial movement of said members to be moved to a position whereat said O-ring is located in said recess to permit relative rotation of said members.

* * * * *